United States Patent
Tormasov

(10) Patent No.: US 8,166,477 B1
(45) Date of Patent: Apr. 24, 2012

(54) SYSTEM AND METHOD FOR RESTORATION OF AN EXECUTION ENVIRONMENT FROM HIBERNATION INTO A VIRTUAL OR PHYSICAL MACHINE

(75) Inventor: Alexander G. Tormasov, Moscow (RU)

(73) Assignee: Parallels IP Holdings GmbH (CH)

( * ) Notice: Subject to any disclaimer, the term of this patent is extended or adjusted under 35 U.S.C. 154(b) by 973 days.

(21) Appl. No.: 12/050,409

(22) Filed: Mar. 18, 2008

Related U.S. Application Data

(60) Provisional application No. 60/896,679, filed on Mar. 23, 2007.

(51) Int. Cl.
G06F 9/455 (2006.01)
(52) U.S. Cl. .......................................... 718/1
(58) Field of Classification Search ................ 718/1
See application file for complete search history.

(56) References Cited

U.S. PATENT DOCUMENTS

| | | | |
|---|---|---|---|
| 6,003,065 A * | 12/1999 | Yan et al. | 709/201 |
| 6,839,819 B2 * | 1/2005 | Martin | 711/162 |
| 6,898,688 B2 * | 5/2005 | Martin et al. | 711/202 |
| 7,007,044 B1 * | 2/2006 | Rafert et al. | 707/655 |
| 7,036,043 B2 * | 4/2006 | Martin et al. | 714/19 |
| 7,203,944 B1 * | 4/2007 | van Rietschote et al. | 718/104 |
| 7,340,645 B1 * | 3/2008 | Martin et al. | 714/15 |
| 7,356,679 B1 * | 4/2008 | Le et al. | 713/1 |
| 7,383,405 B2 * | 6/2008 | Vega et al. | 711/162 |
| 7,716,667 B2 * | 5/2010 | van Rietschote et al. | 718/1 |
| 2003/0131253 A1 * | 7/2003 | Martin et al. | 713/200 |
| 2006/0294351 A1 * | 12/2006 | Rostampour | 713/1 |
| 2007/0006205 A1 * | 1/2007 | Kennedy et al. | 717/168 |
| 2007/0079307 A1 * | 4/2007 | Dhawan et al. | 718/1 |
| 2007/0234337 A1 * | 10/2007 | Suzuki et al. | 717/168 |
| 2008/0104587 A1 * | 5/2008 | Magenheimer et al. | 718/1 |
| 2008/0163207 A1 * | 7/2008 | Reumann et al. | 718/1 |
| 2008/0168188 A1 * | 7/2008 | Yue et al. | 710/15 |

* cited by examiner

*Primary Examiner* — Aimee Li
(74) *Attorney, Agent, or Firm* — Bardmesser Law Group

(57) ABSTRACT

This invention relates to a method, system and computer program product for restoration of a real hardware server or a Virtual Machine server from hibernation. The method starts with running the execution environment on the hardware platform and suspending the execution environment and storing a state of the execution environment; then updating the stored state with drivers corresponding to a new hardware platform; then restoring an updated state on the computing system on the new hardware platform; then continuing operation of the execution environment on the new hardware platform. The state of execution environment includes operating memory state and nonvolatile storage stage.

24 Claims, 4 Drawing Sheets

SYSTEM AND METHOD FOR RESTORATION OF AN EXECUTION ENVIRONMENT FROM HIBERNATION INTO A VIRTUAL OR PHYSICAL MACHINE

CROSS-REFERENCE TO RELATED APPLICATION

This application is a non-provisional application of U.S. Provisional Patent Application No. 60/896,679, filed Mar. 23, 2007, entitled SYSTEM AND METHOD FOR RESTORATION ENVIRONMENT FROM HIBERNATION INTO A VIRTUAL OR PHYSICAL MACHINE, which is incorporated by reference herein in its entirety.

BACKGROUND OF THE INVENTION

1. Field of the Invention

This invention relates to a method, system and computer program product for restoration of a real hardware server or a Virtual Machine server from hibernation.

2. Background of the Related Art

Current trends in system and application development involve ever increasing use of virtualized hardware. For example, cross-platform software now includes not only hardware- and operating system-independent user applications, but also operating systems themselves, as well as virtualization means for adaptation of "non-native" OS's to different hardware platforms. Examples of virtualized hardware are Virtual Machines that virtualize a processor and/or an operating system running on the processor. Examples of such Virtual Machines are marketed by, for example, Parallels Software International, Inc., Microsoft Corporation and VMware, Inc. Other examples of a virtualized server include a Virtual Private Server (VPS, sometimes referred to as a Virtual Environment, VE), such as those marketed by SWsoft, Inc.

Some "ready to start" techniques, such as LiveCD, Live-Distro or the like, use a preferably prepared media containing all the data required for starting and execution of a set of processes without installation. They provide an option to start with any hardware configuration, but with fewer supported possibilities. Another disadvantage is that started system is used for certain purposes, e.g., for hardware testing or configuring and should be removed before starting a native operating system of the computer.

The simplest way to restart a Virtual Execution Environment (VEE) is by restoring it from backup files created continuously while running the VM/VEE, such as can be implemented by restoration software from Acronis, Inc. This approach could be used when restarting the VM/VEE in some current state, since some data, e.g., virtual memory state, is lost in the process of backing up the disk storage.

There are mechanisms in different operating systems that provide a hibernation feature, where a VM/VEE can be restored from a hibernating state, so that application programs can continue executing as if nothing happened.

Microsoft Windows™ 2000 (and later) supports hibernation at the operating system level without special drivers from the hardware manufacturer. Safe Sleep, the Apple Macintosh equivalent of "hibernate", has been available for new Mac models. In the Linux kernel, "Hibernate" or "suspend-to-disk" is implemented by the swsusp command, which is built into the Linux 2.6 series.

Analogous technology may be implemented in a virtual execution environment, e.g., VMware products implement a snapshot feature that captures the entire state of the Virtual Machine at the time it is snapshotted, including the state of all the Virtual Machine's disks, the contents of the Virtual Machine's memory and the Virtual Machine settings. Such a system is disclosed in U.S. Pat. No. 6,795,966.

What is a need in the art of cross-platform saving and restoration of a working state of the computing system. Nevertheless, cross-platform hibernation and restoration is now a problem that cannot be resolved easily, due to different data format of different files, where contents of the Virtual Machines should be migrated. Another problem is different peripheral devices used in different platforms, and even different peripheral device settings that may be used on the same platform.

For example, the operating system that uses IDs of devices (e.g., those of PCI devices) can function incorrectly or even hang if the System Identification Number is somehow changed between "sleep" and "resume".

SUMMARY OF THE INVENTION

Accordingly, the present invention is related to a system, method and computer program product for providing efficiency while pushing the EE contents out of operating memory into non-volatile storage device and further to performing EE functions using data of non-volatile storage, where the Execution Environment (EE) include real computing systems running applications and Virtual Execution Environments (VEEs).

This method relates to migrating execution environment to new hardware platform or new virtual platform. The method starts with running the execution environment on the hardware platform and suspending the execution environment and storing a state of the execution environment; then updating the stored state with drivers corresponding to a new hardware platform; then restoring an updated state on the computing system on the new hardware platform; then continuing operation of the execution environment on the new hardware platform. The state of execution environment includes operating memory state and nonvolatile storage stage.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 4:
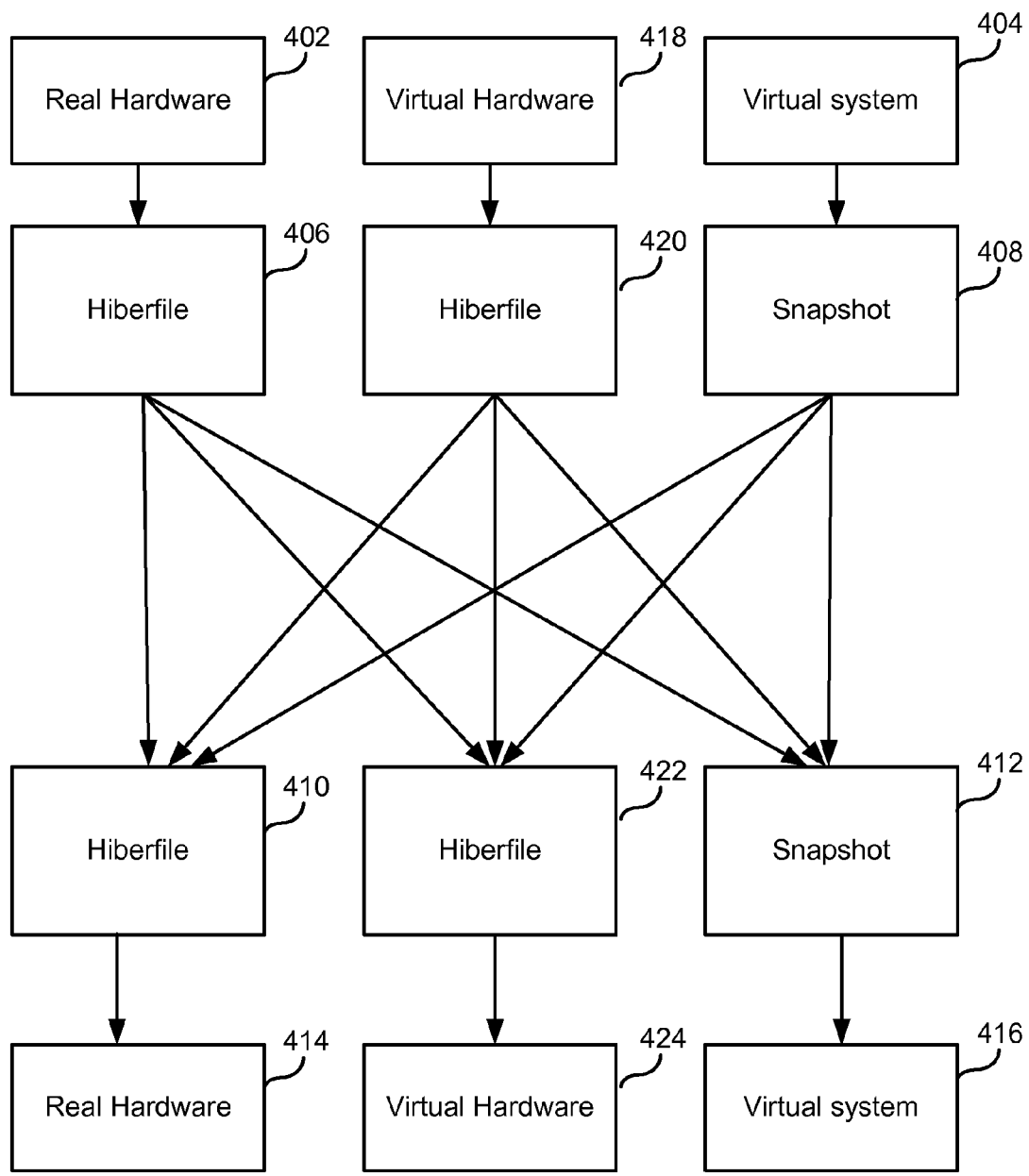

FIG. 4 reflects different combinations of migration implemented in the present invention.

DETAILED DESCRIPTION OF THE PREFERRED EMBODIMENTS

Reference will now be made in detail to the preferred embodiments of the present invention, examples of which are illustrated in the accompanying drawings.

DEFINITIONS

Execution environment (EE)—a virtual or real machine intended for program code execution, usually determined by basic hardware and software characteristics.

VEE—a type of environment that supports program code execution, where at least a part of the real hardware and software required for running program code are presented as their virtual analogs. From the point of view or the user, that the code in VEE runs as if it were running on the real computing system.

VPS—Virtual Private Server (or VE), is one type of a Virtual Execution Environment (VEE) running on the same hardware system with a shared OS kernel and most of the system resources, where isolation of Virtual Execution Environments is implemented on the namespace level. A Virtual Private Server (VPS) is a closed set, or collection, of processes, system resources, users, groups of users, objects and data structures. Each VPS has an ID, or some other identifier, that distinguishes it from other VPSs. The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions is desirable, as if the VPS were a dedicated remote server, with the existence of the VPS being transparent from the perspective of both the VPS user and the VPS administrator.

VM—a type of an isolated Virtual Execution Environment running on the same physical machine simultaneously. Each Virtual Machine instance executes its own OS kernel. Support of Virtual Machines is implemented using a Virtual Machine Monitor and/or a Hypervisor. An example of a VM is a VMware Virtual Machine, or Parallels VM.

Hypervisor—control software having the highest privilege level for administrating hardware computer resources and Virtual Machines. One embodiment of a hypervisor is used in the Xen open source project and virtualization for Windows Server "Longhorn" (Veridian).

Virtual storage—block-level storage space that may be regarded by the user of a computer system as addressable hardware storage, or a storage partition, using virtual addresses that are utilized during virtual disk input/output operations as physical addresses.

Disk image—a set of data that represents contents of a disk storage or contents of a partition corresponding to virtual storage on a block level.

Migration—process of suspending execution environment and starting it on the different hardware platform using intermediate data container. Optionally, data in an intermediate data container may be converted to another format or to be updated to provide hardware compatibility.

VM snapshot—data required for starting a VM in exactly the same state when it was at the prior moment. Since the snapshot is stored as a file, some modification to the file may be implemented before restarting execution environment from the snapshot. One example of the snapshot is Virtuozzo™ process checkpointing.

Hiberfile—a file that contains data that correspond to all or just necessary operative memory blocks of the computing system and processor settings at a certain moment in time. Optionally it may contain other hardware settings and disk data.

The present invention provides for embedding Execution Environments (EEs) into different hardware platforms in the state as if it were snapshotted or hibernated at a previous point in time.

One feature is storing a current state of the real machine or a Virtual Machine in an available form and then using the stored data, e.g., memory state and state of the processor's registers when restarting the EE. Further, the EE can be restored with new hardware settings. The process of updating hardware settings, including replacing hardware settings or new hardware installation, may be performed in the process of EE restoration, or before or after EE restoration. In some embodiments, environment settings may be updated for effective hardware support before EE restoration by updating a previously-stored EE hiberfile or snapshot. Also, the VEE can be migrated into a new mode of the same hardware system, e.g., using INTEL Virtualization Technology for Directed I/O. Another embodiment may include updating a hiberfile to allow restoration of the real machine on different hardware.

Another alternative may include predefined setting patches applied to the snapshot before or during restarting a EE from the snapshot.

Another alternative may include virtualization of the original hardware (e.g., SCSI drives or LAN) required for effective restarting of the EE and then updating corresponding drivers to drivers required by the current user.

Required drivers can be not only real hardware drivers that are available for new platform where the EE is restarted, but also drivers where new virtual hardware is used. For example, some virtualized devices may be the new ones. In other embodiments, the system may be hibernated on real hardware and restored on a Virtual Machine with the virtual devices being the same as if it were in a real hardware box or otherwise in a real computing system. For implementation of this or other embodiments, INTEL VT-d technology or similar, e.g., AMD DEV, may be used. Also, a back up of the storage device of the EE might be used. For example, if the EE restoration is performed on the same computing system, the original storage device may be used for restoring the EE. A snapshot of the EE needs to be created and used to restart in the EE on a new hardware platform (real or virtual).

A hiberfile is a hibernation system file and may contain the full contents of the system random access memory (RAM). Hibernation is a special kind of shutdown. The system stops all activity, and the hibernation system writes the contents of RAM and some CPU settings to a special file on the hard drive (often called "hiberfil.sys" or similar). When the computer (such as a laptop) awakens from hibernation, it does not go through a full reboot. Instead, it loads the contents of the hibernation file into memory, and thus restores the exact same condition the hardware system was in, when the hibernation was started, optionally by re-initialization of the hardware.

Note that hibernation is supported by all modern operating systems, e.g., Windows, Linux and MacOS.

Since VM technology (e.g., computer systems with a VMM or a Hypervisor) uses virtualization means and the virtualized OS may, in some sense, be considered a user application, the VM, in any state, may be suspended and its state may be stored on a mass storage device without suspending of the whole supporting hardware system. Different virtualization technologies use different formats of the snapshot, but most of them can store contents similar to hiberfile information. In other words, using a hiberfile or a snapshot provides for restoring the EE in the same condition as if it was not interrupted. Knowing the rules of snapshot image creation and the principles of memory management, it is possible to convert a hiberfile image of the real system to a snapshot of the Virtual Machine, and to convert the snapshot of one VEE with random settings, but matched to certain tasks to a snapshot of the VEE, similar to a real execution environment, e.g., with settings requested by user.

Problems related to hardware differences may be avoided either at the conversion stage or after the start of the EE from a snapshot or a hiberfile image. The simplest way may be, for example, using Parallels Software International, Inc. technology for interrupt handling, where interrupts are triggered during a first attempt to call an illegal device or a device that is not installed in the shell of the VEE. Also, a lightweight VMM used for Intel Embedded IT or Intel® Active Management Technology (Intel® AMT) or vPro may be used, which allows direct control of at least some of the hardware from a Virtual Machine.

When the drivers do not match or are not all available after the restart, they could be downloaded or provided by the user, and then installed, or replace the existing ones.

Thus, the invention may be used for porting an active EE from one hardware platform to another, with minimal downtime. The hardware platform may be either a real platform or virtual platform. As an option, where the EE is porting from one real hardware platform to a different real hardware platform, one hiberfile may be converted to another hiberfile, similar to conversion of snapshot image of the VM. In this implementation, runtime updates of an image, replacing drivers, etc. may be performed.

Minimal booting time is required for starting the ported EE on a different hardware platform, since operating system initialization is not required. Updating of the hardware drivers may be implemented by using on-the-fly patching technology, e.g., NuMega SoftICE (a kernel mode debugger for Microsoft Windows designed to run underneath Windows such that the operating system is unaware of its presence). This technology may be used for driver debugging and debugging functions of the kernel of the operating system. One embodiment of such a technology is described in U.S. patent application Ser. No. 10/725,016; Filed: Dec. 2, 2003, entitled System, Method and Computer Program Product for On-The-Fly Patching of Executable Code (now U.S. Pat. No. 7,472, 384), incorporated herein by reference.

Another embodiment of the invention may use OS and hardware embedded functions, such as Plug-and-play (PnP) signals, to force the OS to replace hardware (real or emulated) by PnP signals issued due to new hardware appearance. An example of such a system is disclosed in U.S. Pat. No. 7,111, 086 assigned to VMware, Inc.

Preliminary prepared patches, such as SWSoft's Virtuozzo™ technology or replacing driver calls by interrupt instructions (Parallels Software International, Inc. technology) may be used for adaptation of the image (mainly hiberfile image) to the hardware platform. In this case, hardware critical for starting execution environment may be initially emulated, other hardware calls may by initially ignored or redirected using interrupts and on-the-fly code analysis.

In an off-line version, the system is shut down, and a set of files that represent the state of Virtual Machine at the moment of shut down stored on a disk. When the set of files has to be restarted from the disk, the hardware settings may require configuration and readjustment to be compatible with the hardware platform.

In an on-line version, the snapshot is generated without interrupting the system, on-the-fly. For example, when a snapshot is generated from a live VM, there is always a concern for possible discrepancies and inconsistencies between what is actually on the disk and what the VM "thinks" is on the disk. Ideally the snapshot is generated when all the processes are finished, however, in the reality the snapshot could attempt to be generated while some processes are still running (e.g., writing to the disk is still taking place). If that is the case, the transient processes must be completed to avoid inconsistencies between the reality and what VM "thinks" the reality is.

It should be noted that some emulation may be required permanently, e.g., when virtual storage of a Virtual Machine is used after porting a disk drive of the standalone OS. After porting (migrating), most of user processes running under the control of the OS kernel stay active and continue working with the same contents.

The invention may be used for switching a system from real hardware to virtual or back and may also be used for switching between real hardware platforms or between virtual hardware when required for resolving specific tasks, e.g., 3D graphics applications optimization that require different 3D graphics hardware; accelerating tasks previously running in the VM with some performance degradation; testing execution environment for new hardware compatibility; executing hardware testing in less time; starting the entire operating system in a background mode; emergency secure isolation of the operating system, and so on.

Since boot loading in the present invention is drastically simplified, the invention can resolve some problems of booting operating systems on non-native hardware platforms, e.g., swapping guest and host OS's may be performed.

One more option for driver tuning during creation of the hyberfile is to install redirection procedure implemented as a (native for EE) driver that only redirect I/O requests to an already installed hardware driver corresponding to hardware configuration. The redirection procedure transparently replaces the native driver of the EE.

Scalability and portability of any operating system is provided, since operating system resources may be dynamically allocated to any hardware environment and are substantially independent of the hardware storage configuration. Optionally, the physical system may be suspended and resumed on different hardware boxes or in Virtual Machines with different hardware, including Virtual Machines running on remote (as opposed to local) hardware systems.

The Virtual Execution Environment, as discussed herein, may be of any number of types. For example, they can be Virtual Private Servers. They can be Virtual Machines, such as those from VMware or Microsoft. They can be Virtual Machines, in the model of XEN, that use a Hypervisor and a Service OS. They can also be Virtual Machines that utilize a Lightweight Hypervisor, such as those marketed by Parallels Software International. Also, SWsoft, Inc.'s isolated Virtual Execution Environments, such as Virtuozzo™, may be used as another example.

An example of technology available for updating execution environment snapshot where disk storage format differs from one platform to another is disclosed in U.S. patent application Ser. No. 11/757,598; Filed: Jun. 4, 2007, entitled: SYSTEM AND METHOD FOR MANAGEMENT OF VIRTUAL EXECUTION ENVIRONMENT DISK STORAGE, incorporated herein by reference.

The example of effective driver adjustment that may be implemented in the present invention is disclosed in U.S. patent application Ser. No. 11/673,585; Filed: Feb. 11, 2007, entitled: SYSTEM AND METHOD FOR USING VIRTUAL MACHINE FOR DRIVER INSTALLATION SANDBOX (now U.S. Pat. No. 7,941,813), incorporated herein by reference.

One embodiment of code modification that may be implemented for effective code adaptation to hardware requirements is disclosed in U.S. patent application Ser. No. 10/725,016; Filed: Dec. 2, 2003, entitled System, Method and Computer Program Product for On-The-Fly Patching of Executable Code (now U.S. Pat. No. 7,472,384), incorporated herein by reference. The technology may be implemented for replacing drivers, including usage of redirection procedures for redirecting requests to drivers corresponding to the actually installed hardware.

Figure 1:
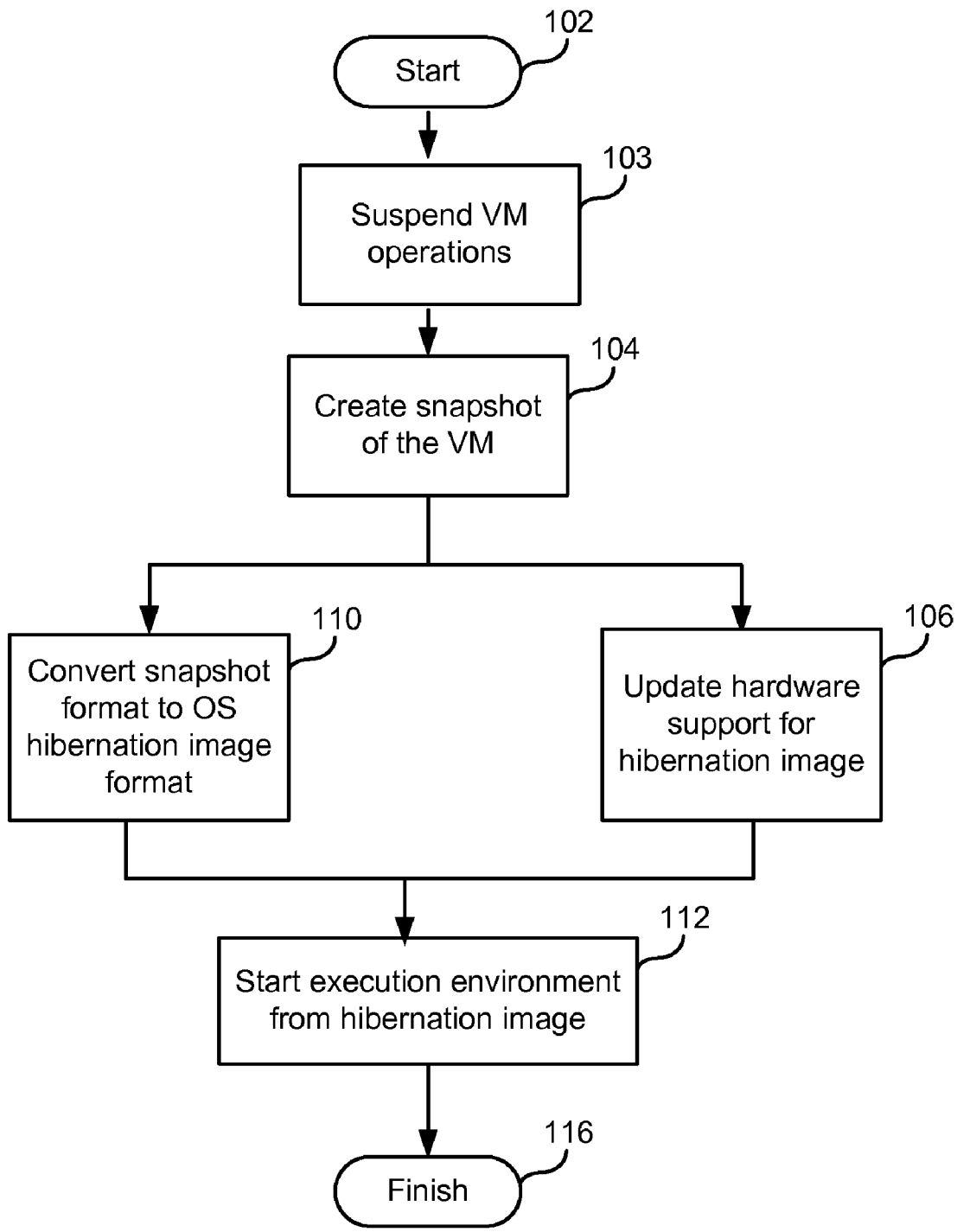
FIG. 1 is a flowchart of embedding a VEE from a real to a virtual hardware platform.

FIG. 1 illustrates an embodiment where the VEE is ported from a virtual hardware platform to a real hardware platform. After start (step 102), in step 103, the virtual hardware platform suspends VEE operations. In step 104, virtual memory and VM settings related to the current state of the VEE are snapshotted and the snapshot is stored as a file or as a set of files in the format defined by the particular VM implementation and the hardware that the VM is emulating.

In step 110, the data in the snapshot is converted to a format native to the real hardware of the computing system. Converted data provides for execution of code contained in the snapshot from the point (or the nearest point) from the instruction where the VEE was suspended. The data is then stored in a format providing starting executable instructions on the hardware platform, e.g., as a hyberfile.sys file usable by OS Windows.

As additional steps data related to the execution environment settings may be updated, e.g., data related to number of CPUs, related to CPU type, CPU vendor (e.g., Intel or AMD), available memory size, Advanced Programmable Interrupt Controller (APIC) version, CPU architecture (32 bit or 64 bit), and so on. This update may be done for each migration direction while performing migration from one platform (virtual or real) to another platform (virtual or real). Also, some execution environment identification and authentication data may be updated, including data that characterize environment itself, e.g., IP address of the server, MAC-address data, CID, security keys for digital signature, domain attributes, SID, user ID, user account data or the like.

Also, in step 106, code analysis software checks program instruction sequences require modification and, optionally, settings and drivers of the OS previously virtualized for this VM and loads hyberfile execution without abnormal termination. During step 106, OS template support, analogous to SWsoft's Virtuozzo™ technology, may be implemented for embedding required software or substituting some instructions by interrupts then being handled with software debugger, as implemented in Parallels Software International, Inc.'s Virtualization technology. Some other embodiments may include usage of Xen hypervisor, VMware Virtual Machine Monitor, Sun container, Microsoft Virtual Server, Parallels Virtual Machine, SWSoft Virtuozzo™ VE or the like. In some embodiments, technologies similar to paravirtualization may be used for providing a software interface to Virtual Machines that is similar but not identical to that of the computing system hardware. In one embodiment of such implementation, when a request by the EE's driver could not be implemented on the kernel level, the request is redirected to an external driver implemented, e.g., in the hypervisor or in VMM or on the application level.

Also, for Plug-and-play (PnP) compatible devices, PnP signals may be used for replacement drivers or driver installation using stubs. To implement this option, a so-called "stub" driver may be installed before stating environment from the snapshot or hiberfile. The stub driver further may be used as a placeholder for driver required by execution environment or hardware conditions or may be used as a redirection module providing access to appropriate driver. Note that steps 110 and 106 may be implemented simultaneously or independently from each other. When step 110 and at least a part of step 106 (sufficient for safe execution of hiberfile instructions) are implemented, the hardware system starts from hiberfile.

In step 112, execution environment operation is restarted from the image, and the process ends in step 116.

Figure 2:
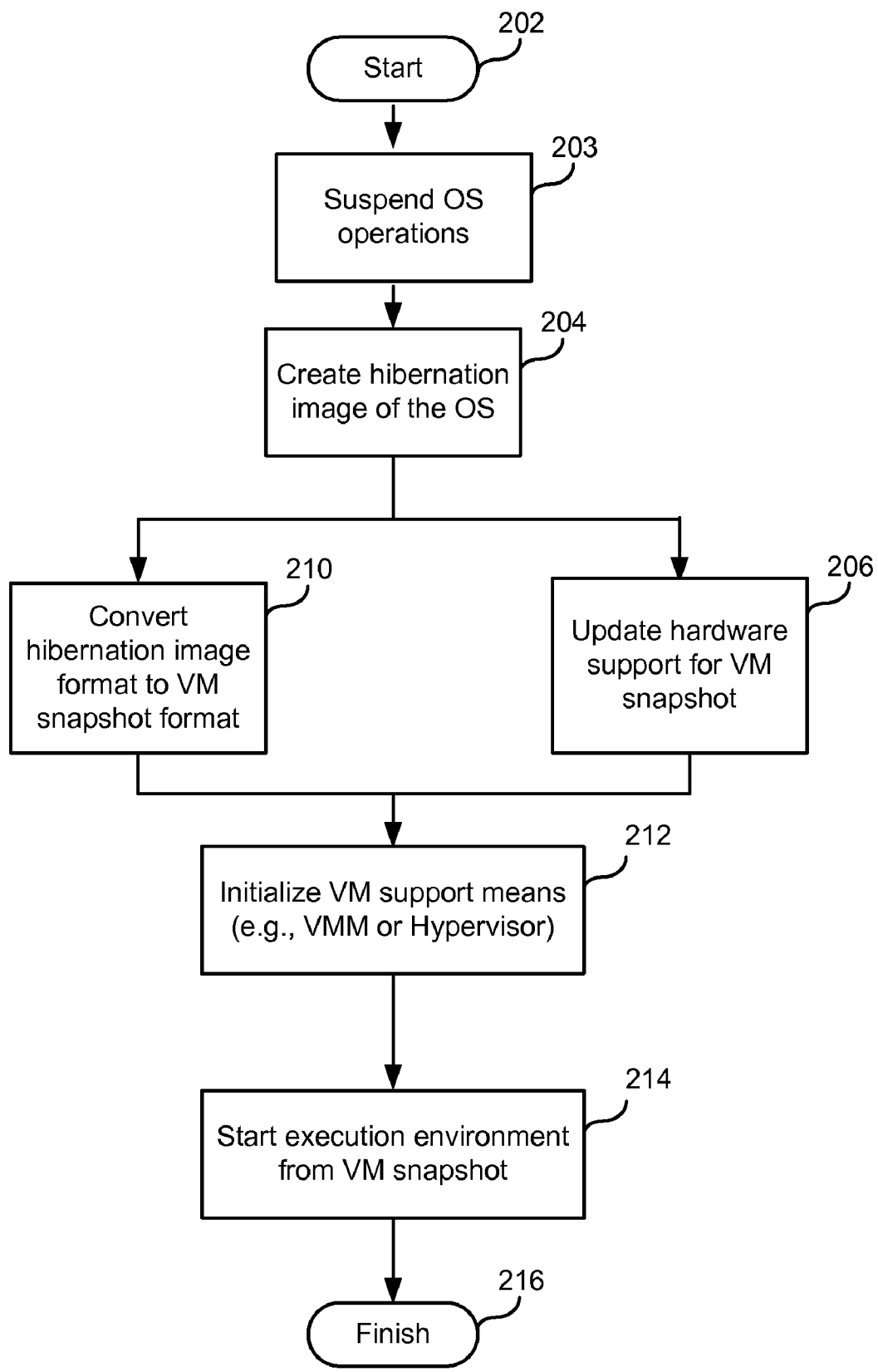
FIG. 2 is a flowchart of embedding a VEE from virtual to real hardware platform.

FIG. 2 illustrates another embodiment of the invention where a VEE is ported from a real hardware platform to a virtual hardware platform.

After start (step 202), in step 203, the hardware platform suspends VEE operations. In step 204, all memory and processor settings related to the current state of the VEE are stored in the hiberfile or in a similar set of files in the format defined by running OS or defined by software means embedded to the hardware system independently from the OS.

In step 210, the data in the snapshot is converted to a format native for the virtual environment to which the VEE should be ported. Indeed, the Virtual Machine may be viewed as available for direct start of operations from hiberfile. The data from which the VEE should start should provide the possibility of execution code containing in the hiberfile or a snapshot into which the hiberfile is converted from the point (or the nearest point) of the instruction where the VEE was suspended. In the latter case, the data is stored in a format providing for starting executable instructions on the virtualization platform, e.g., as a snapshot image, as mentioned earlier.

Also, in step 206, code analyzing software checks program instructions and, optionally, settings and drivers of OS where the execution environment was previously run. This step provides for a possibility of loading hiberfile or snapshot execution without abnormal termination. Step 206 may be implemented in a number of ways. One alternative is adjusting the Virtual Environment setting as if it were hardware platform where the VEE was previously run. Another alternative is adjusting snapshot configuration according to an already-configured VM. Another alternative is adjusting a VM based on the user's choice and then adjusting snapshot configuration according to the VM configuration.

Other alternatives are also possible. OS templates support analogous to Virtuozzo™ technology may also be implemented or may be implemented by substituting some instructions in the snapshot or hiberfile by interrupts then being handled with software debugger as implemented in Parallels Virtualization technology. Note that steps 210 and 206 also may be implemented simultaneously or independently from each other. When step 210 and at least a part of step 206 (sufficient for safe execution of hiberfile or snapshot instructions) are implemented, the VEE may start in the virtual hardware environment. In step 212 VM support means are initialized, e.g., VMM or hypervisor starts under the support of the Host OS and, in step 214, the execution environment may be started from the snapshot. The process finishes in step 216. Note that even a real machine can start from hypervisor as a VEE. In this embodiment, the boot partition and the boot VM may be created to start the environment of a real machine inside a virtual environment.

FIG. 4 shows some of the embodiments where the invention may be implemented. Using the invention, an execution environment may be migrated from real hardware 402 to a virtual system 416 and from a virtual system 404 to real hardware 414 using conversion of hiberfile 406 to snapshot 412 and of snapshot 408 to hiberfile 410. This process may take place through an intermediary step of virtual hardware 418 migrating to a virtual system 416 or to real hardware 414 using conversion of intermediary hiberfile 420 to hibefile 410 or to snapshot 412. Further, an execution environment may be migrated from real hardware 402 to a virtual hardware 424 and from a virtual system 404 to a virtual hardware 424 using a migration of hiberfile 406 to hiberfile 422 and using conversion of snapshot 408 to hiberfile 422. However, when real hardware systems 402 and 414 are identical (in terms of their physical characteristics), and virtual systems 404 and 416 are the same virtual platforms (in terms of the hardware they are emulating), the migration task is easier, when the systems are substantially different, the invention may also be used for migration process between physical boxes, where the hardware box on which the VEE should be restarted can be different from the original hardware box where the VEE was originally running. The invention may also be used the real hardware system is places inside the virtual system. After restarting it several times the real hardware system becomes the virtual system on VM.

Figure 3:
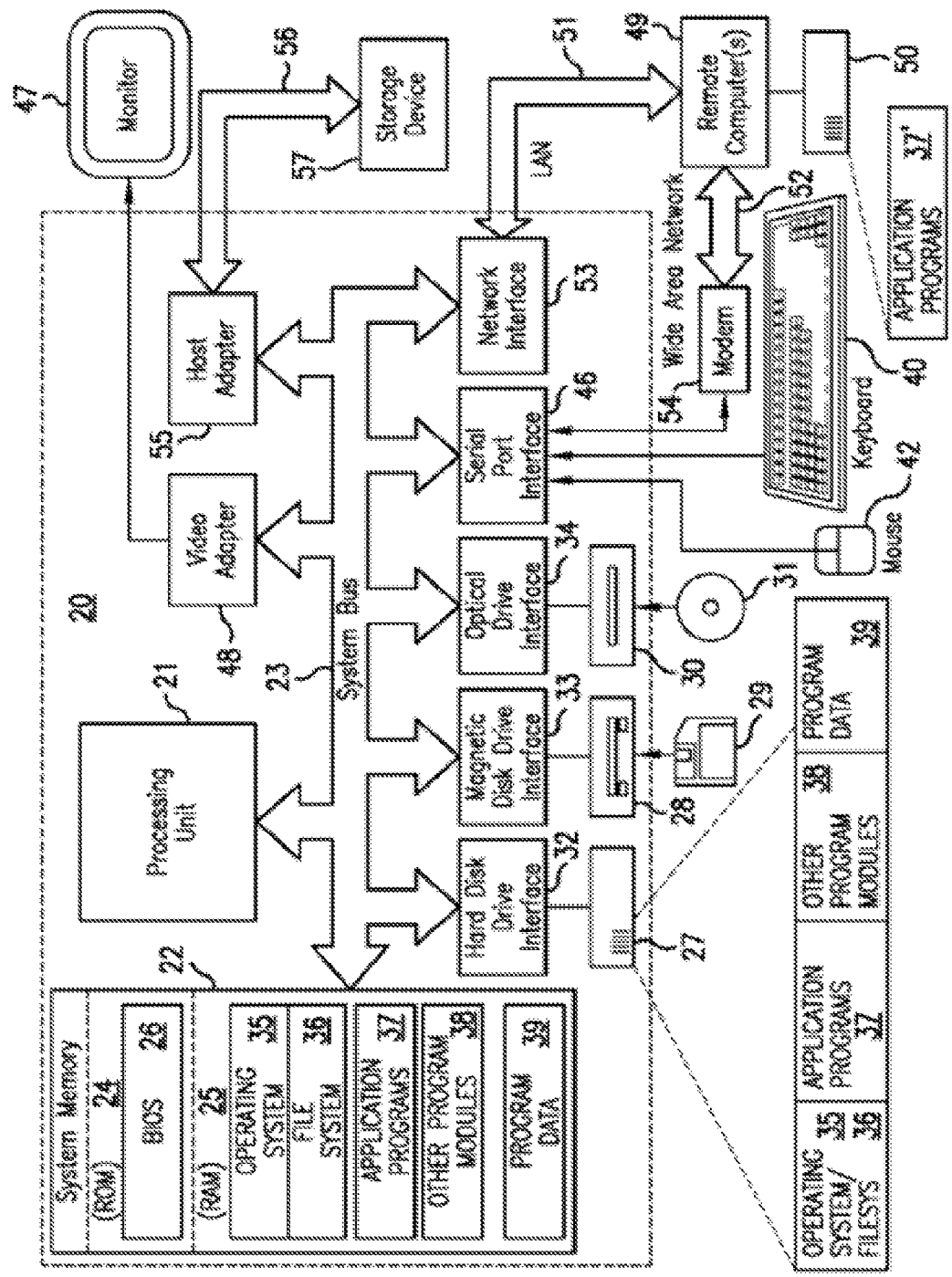
FIG. 3 is an example of the computing system where the present invention may be implemented.

With reference to FIG. 3, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for migrating a virtual execution environment to a new hardware platform, the method comprising:
when running the virtual execution environment on an old hardware platform, suspending the virtual execution environment and storing non-volatile storage state, memory and processor settings related to a current state of the virtual execution environment, including driver executable code and OS kernel data loaded into the memory;
updating the stored state with driver data, storable settings and settings related to driver configuration corresponding to the new hardware platform, wherein the driver serves as a software interface to peripheral hardware;
restoring an updated state on the new hardware platform or a new virtual platform; and
continuing operation of the virtual execution environment on the new hardware platform.

2. The method of claim 1, wherein the suspending step includes creating a snapshot of the execution environment.

3. The method of claim 2, further comprising converting the snapshot of the execution environment to a hibernation image format.

4. The method of claim 1, wherein the suspending step includes creating a hibernation image of the execution environment.

5. The method of claim 4, further comprising converting the hibernation image of the execution environment to a snapshot format.

6. The method of claim 1, wherein the restoring is done in parallel with the updating.

7. The method of claim 1, wherein an identification of the virtual execution environment is updated.

8. The method of claim 1, wherein the identification includes any of IP data, MAC-address data and CID.

9. The method of claim 1, wherein an authentication data of the virtual execution environment is updated.

10. The method of claim 9, wherein the authentication data includes any of security keys for digital signature, domain attributes, SID, and user ID.

11. The method of claim 1, wherein the virtual hardware platform uses any of Xen hypervisor, VMware Virtual Machine Monitor, Sun container, Microsoft Virtual Server, Parallels Virtual Machine and Virtuozzo™ Virtual Environment.

12. The method of claim 1, further comprising creating multiple states of the execution environment at different points in time and storing the multiple states in incremental form.

13. The method of claim 1, wherein the step of updating the stored state is implemented by adjusting settings of the virtual execution environment as if it were a hardware platform where the virtual execution environment previously ran.

14. The method of claim 1, wherein the step of updating the stored state is implemented by adjusting snapshot configuration according to an already configured execution environment.

15. The method of claim 1, wherein the step of updating the stored state is implemented by adjusting the virtual execution environment based on a user's selection and then adjusting snapshot configuration to correspond to the virtual execution environment's hardware configuration.

16. A non-transitory computer useable storage medium having computer executable program logic stored thereon for executing on a processor, the program logic implementing the steps of claim 1.

17. A system for migrating an execution environment to a new platform hardware or a new virtual platform, the system comprising:
a processor;
a memory; and
computer code loaded into the memory and executed on the processor for implementing the steps of claim 1.

18. A method for migrating an execution environment to a new virtual platform, the method comprising:
when running the execution environment as a physical server on an old hardware platform, suspending the execution environment and storing non-volatile storage state, memory and processor settings related to a current state of the execution environment, including driver executable code and OS kernel data loaded into the memory;
updating the stored state with driver data, storable settings and settings related to driver configuration corresponding to the new virtual platform, wherein the driver serves as a software interface to peripheral hardware;
restoring an updated state on the new virtual platform; and
continuing operation of the execution environment, as a virtual server, on the new virtual platform.

19. A method for migrating a virtual execution environment to a new virtual platform, the method comprising:
when running the virtual execution environment on an old hardware platform, suspending the virtual execution environment and storing non-volatile storage state, memory and processor settings related to a current state of the virtual execution environment, including driver executable code and OS kernel data loaded into the memory;
updating the stored state with driver data, storable settings and settings related to driver configuration corresponding to the new virtual platform, wherein the driver serves as a software interface to peripheral hardware;
restoring an updated state on the new virtual platform; and
continuing operation of the virtual execution environment on the new virtual platform.

20. A system for migrating execution environments to a new physical hardware platform, the system comprising:
a real hardware platform running a Virtual Execution Environment (VEE) as a server, wherein the VEE is suspended;
a snapshot representing a state of the VEE before the suspension;
a hiberfile containing memory and processor state relating to a current state of the VEE before the suspension, including driver executable code and OS kernel data loaded into the memory;
a plurality of drivers used for updating the stored snapshot and the hiberfile that correspond to the new physical hardware platform, including updating the stored state with driver data, storable settings and settings related to driver configuration, wherein the drivers serve as a software interface to peripheral hardware;

wherein the virtual execution environment is started as a physical server from the updated hiberfile and the snapshot on the new physical hardware platform.

21. A method for migrating a virtual execution environment to a new platform, the method comprising:
when running the virtual execution environment on an old platform, suspending the virtual execution environment and storing non-volatile storage state, memory and processor settings related to a current state of the virtual execution environment, including driver executable code and OS kernel data loaded into the memory;
updating the stored state with driver data, storable settings and settings related to driver configuration corresponding to the new platform, wherein the driver serves as a software interface to peripheral hardware;
restoring an updated state on the new platform; and
continuing operation of the virtual execution environment on the new platform.

22. The method of claim 21, wherein the old platform is one of a hardware platform, a virtual platform, and a combination of a hardware and virtual platform, wherein the new platform a new hardware platform that is has different specifications than the old platform, or the new hardware platform has a new virtual platform or is a combination of the new hardware and the new virtual platform.

23. The method of claim 22, wherein any of the hardware platforms is a real set of hardware and any of the virtual platforms has a set of virtualized hardware means.

24. The method of claim 21, wherein the stored state is any of: a snapshot of a virtual execution environment, a Virtuozzo dumpfile for online migration, a Linux swap partition, a MacOS hiberfile and a Windows hiberfile.

* * * * *